(12) United States Patent
Mancosu et al.

(10) Patent No.: US 8,024,087 B2
(45) Date of Patent: Sep. 20, 2011

(54) METHOD AND SYSTEM FOR DETERMINING A CORNERING ANGLE OF A TYRE DURING THE RUNNING OF A VEHICLE

(75) Inventors: Federico Mancosu, Milan (IT);
Massimo Brusarosco, Milan (IT);
Daniele Arosio, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1029 days.

(21) Appl. No.: 11/663,859

(22) PCT Filed: Sep. 29, 2004

(86) PCT No.: PCT/EP2004/052355
§ 371 (c)(1),
(2), (4) Date: Sep. 25, 2007

(87) PCT Pub. No.: WO2006/034731
PCT Pub. Date: Apr. 6, 2006

(65) Prior Publication Data
US 2008/0103659 A1    May 1, 2008

(51) Int. Cl.
*G05D 1/00*     (2006.01)
*B60C 23/06*    (2006.01)

(52) U.S. Cl. .............. 701/37; 701/65; 701/41
(58) Field of Classification Search .......... 701/37, 701/38, 65, 41
See application file for complete search history.

(56) References Cited

U.S. PATENT DOCUMENTS

| | | | |
|---|---|---|---|
| 5,749,984 A * | 5/1998 | Frey et al. ............... | 152/415 |
| 5,864,056 A * | 1/1999 | Bell et al. ............... | 73/146 |
| 5,877,679 A * | 3/1999 | Prottey ................... | 340/442 |
| 6,538,566 B1 * | 3/2003 | Morand et al. .......... | 340/444 |
| 6,539,295 B1 * | 3/2003 | Katzen et al. ............ | 701/29 |
| 6,614,343 B1 * | 9/2003 | Fennel et al. ............ | 340/425.5 |
| 6,763,288 B2 * | 7/2004 | Caretta et al. ........... | 701/1 |
| 6,799,092 B2 * | 9/2004 | Lu et al. ................. | 701/1 |
| 7,249,498 B2 * | 7/2007 | Miyoshi et al. ......... | 73/146 |
| 7,394,357 B2 * | 7/2008 | Kurata .................... | 340/447 |
| 7,412,879 B2 * | 8/2008 | Serra et al. .............. | 73/146 |
| 7,469,578 B2 * | 12/2008 | Matsuda et al. ........ | 73/146 |
| 7,497,112 B2 * | 3/2009 | Kobayakawa ......... | 73/146 |
| 7,513,144 B2 * | 4/2009 | Miyoshi .................. | 73/146 |
| 7,546,764 B2 * | 6/2009 | Morinaga et al. ...... | 73/146 |
| 7,568,384 B2 * | 8/2009 | Morinaga ............... | 73/146 |
| 7,676,307 B2 * | 3/2010 | Schmitt et al. ......... | 701/38 |
| 2003/0050743 A1 * | 3/2003 | Caretta et al. ........... | 701/1 |
| 2003/0058118 A1 | 3/2003 | Wilson | |

(Continued)

FOREIGN PATENT DOCUMENTS

EP    0 887 211 A1    12/1998

(Continued)

*Primary Examiner* — Khoi Tran
*Assistant Examiner* — Jason Holloway
(74) *Attorney, Agent, or Firm* — Finnegan, Henderson, Farabow, Garrett & Dunner, L.L.P.

(57) ABSTRACT

A method and a system for determining a cornering angle of a tire fitted on a vehicle during a running of the vehicle on a rolling surface includes the steps of determining the lateral acceleration of a portion of the tire tread spaced apart from the equatorial plane of the tire; determining a rotation speed of the tire; and determining the cornering angle from the lateral acceleration and the radial speed by using characteristic curves of lateral acceleration amplitude versus predetermined values of cornering angle for at least one rotation speed.

41 Claims, 8 Drawing Sheets

U.S. PATENT DOCUMENTS

| | | |
|---|---|---|
| 2003/0159503 A1 | 8/2003 | Mancuso et al. |
| 2003/0163231 A1* | 8/2003 | Meyers et al. .................... 701/1 |
| 2003/0167832 A1 | 9/2003 | Novak et al. |
| 2005/0234613 A1* | 10/2005 | Brusarosco et al. ............ 701/29 |
| 2006/0028333 A1* | 2/2006 | Tyndall ........................ 340/447 |
| 2007/0151334 A1* | 7/2007 | Serra et al. ...................... 73/146 |

FOREIGN PATENT DOCUMENTS

| | | |
|---|---|---|
| WO | WO-01/08908 A1 | 2/2001 |
| WO | WO-03/016115 A1 | 2/2003 |
| WO | WO-03/082643 A1 | 10/2003 |

* cited by examiner

METHOD AND SYSTEM FOR DETERMINING A CORNERING ANGLE OF A TYRE DURING THE RUNNING OF A VEHICLE

CROSS REFERENCE TO RELATED APPLICATION

This application is a national phase application based on PCT/EP2004/052355, filed Sep. 29, 2004, the content of which is incorporated herein by reference.

BACKGROUND OF THE INVENTION

1. Field of the Invention

The present invention relates to a method and a system for determining a cornering angle of a tyre mounted on a vehicle, during running of such a vehicle.

2. Description of the Related Art

Information related to tyre conditions should be provided to a vehicle control system in order to control a vehicle. For example, such information may include the one relating to the load exerted on the tyres or to the length of the contact region between the tyre and the ground.

PCT patent application no. WO 03/016115 discloses a method for determining the charge or load exerted on a tyre of a motor vehicle and/or for monitoring tire pressure, wherein the pressure in each tyre is detected during operation of the vehicle and the rotational behavior of the individual wheels is observed. Load distribution parameters are also determined by comparing the rotational behavior and/or changes in said rotational behavior of the individual wheels during given driving states, taking into account preset and/or predetermined and/or learned variables. Tyre pressure and load distribution parameters are used to determine the load or charge exerted on the tyres and/or pressure loss. Furthermore, US patent application no. 2003/0058118 discloses a vehicle and vehicle tyre monitoring system, apparatus and method for determining the load-induced deflection or deformation of a vehicle tyre. Based thereon, deflection-related information, such as tyre load, molar air content, total vehicle mass, and distribution of vehicle mass, are provided.

U.S. Pat. No. 6,538,566 describes a process for the in-service monitoring of the condition of a tyre of a wheel riding on a ground, the tyre having a tread, the process comprising the steps of: providing in the tyre, near the tread, a miniature sensor for sensing radial acceleration; monitoring the variations in the measurement from the sensor; detecting a decrease in the radial acceleration, said decrease corresponding to a zone of the tread in contact with the ground; and measuring a period of low radial acceleration phases and a fraction of this period during which the radial acceleration is low, said fraction within each period being related to a length of said zone where the tread is in contact with the ground, and thereby to the condition of the tyre.

EP 0 887 211 relates to pneumatic tyres for vehicles and in particular to a system for monitoring tyres by monitoring their deflection. The system comprises: a sensor device operatively arranged with respect to the tyre to create an electrical pulse during the footprint pass corresponding to a deformation of the tyre; means for calculating a ratio of the duration of said electrical pulse to the duration of one tyre revolution; and means for transmitting said ratio to an evaluating unit placed in the vehicle, wherein said sensor device is placed within the tread area of said tyre in order that said electrical pulse presents a first maximum at the entrance and a second maximum at the leaving of said footprint pass.

SUMMARY OF THE INVENTION

According to the Applicant, it would be desirable to measure the cornering angle of a tyre fitted on a vehicle during the running of such a vehicle on a rolling surface. For the purposes of the present invention, by "cornering angle of a tyre" it has to be intended the angle (instantaneously determined) between the equatorial plane of the tyre and the direction of advancing of the vehicle on which the tyre is fit. It has to be noticed that during the cornering of a vehicle, the advancing direction corresponds, at each instant, to the direction tangent to the cornering trajectory followed by the vehicle. The cornering angle is a basic parameter for controlling a vehicle and avoiding any instabilities thereof, such as, for example, yaw instabilities. It has to be noticed that a certain steering angle that is set in a vehicle could result in a different cornering angle of a tyre. This is because of several reasons, including the fact that a tyre is made of deforming rubber. Thus, the cornering angle to which the tyres are subjected during a steering manoeuvre cannot be easily deducted from a measurement performed on the vehicle.

The Applicant has faced the problem of determining in real-time, i.e. during the running of the vehicle, in a reliable and easier way, the cornering angle to which a tyre fitted on the vehicle is subjected.

According to a first aspect, the present invention provides a method for determining a cornering angle of a tyre fitted on a vehicle during a running of said vehicle on a rolling surface, the method comprising: determining an acceleration in lateral direction to which a portion corresponding to a tread of said tyre is subjected, at a distance from an equatorial plane of said tyre; determining a rotation speed of said tyre; and determining said cornering angle from said lateral acceleration and said radial speed.

The step of determining the acceleration in lateral direction may include acquiring a lateral acceleration signal when said portion of the tyre is outside a contact region between said tyre and said rolling surface, and acquiring a lateral acceleration signal when said portion of the tyre is within said contact region.

In particular, the step of determining the acceleration in lateral direction comprises calculating an average level of the lateral acceleration signal outside said contact region and calculating a peak value of said lateral acceleration signal within said contact region.

Preferably, the step of determining the acceleration in lateral direction comprises calculating a lateral acceleration amplitude as a difference between said average level and said peak value.

Preferably, a step of low-pass filtering said lateral acceleration signal is provided.

Preferably, the step of determining the rotation speed of said tyre comprises acquiring a radial acceleration signal.

Typically, the step of acquiring a radial acceleration signal comprises the step of acquiring such a radial acceleration signal at or in proximity of said equatorial plane of the tyre.

According to a preferred embodiment, the step of determining the rotation speed of said tyre comprises calculating an average radial acceleration outside said contact region between said tyre and said rolling surface.

Preferably, the step of determining said cornering angle comprises providing characteristic curves of lateral acceleration amplitude versus predetermined values of cornering angle for at least one rotation speed.

According to an embodiment of the present invention, the method further comprises the step of providing a fit equation approximating said characteristic curves.

Preferably, said step of providing a fit equation comprises providing an equation of a straight line in a plane, and wherein said method further comprises associating values of slope and intercept of said fit straight line for at least one value of tyre rotation speed.

According to a second aspect, the present invention provides a system for determining a cornering angle of a tyre fitted on a vehicle during a running of said vehicle on a rolling surface, said system comprising: at least one device adapted for determining an acceleration in lateral direction of a portion of said tyre corresponding to a tread of said tyre, the portion being located at a distance from an equatorial plane of said tyre; at least one device adapted for determining a rotation speed of said tyre; and at least one processing unit being adapted to determine said cornering angle from said lateral acceleration and said radial speed.

Preferably, said at least one device for determining the acceleration in lateral direction comprises at least one lateral accelerometer adapted for producing at least one lateral acceleration signal.

According to one embodiment, said at least one device for determining the rotation speed comprises at least one radial accelerometer adapted for producing at least one radial acceleration signal.

Preferably, said at least one device for determining the acceleration in lateral direction and said at least one device for determining the rotation speed of said tyre comprises at least one sampling device adapted to sample signals at a frequency of at least 5 kHz.

Preferably, said at least one sampling device is adapted to sample signals at a frequency of at least 7 kHz.

Preferably, the system of the invention further comprises at least one memory associated to said processing unit.

According to one embodiment, said at least one memory comprises pre-stored characteristic functions of cornering angle versus lateral acceleration amplitudes, corresponding to predetermined values of tyre rotation speed.

Preferably, said at least one device for determining said acceleration in lateral direction is included in at least one sensor device associated to said portion of said tyre.

Typically, said at least one sensor device is disposed at a distance from said equatorial plane of the tyre comprised between 15% and 30% of the tread width, more preferably between 18% and 28% of the tread width, even more preferably between 20% and 25%.

Preferably, said at least one sensor device is secured to an inner liner of the tyre.

Preferably, at least one damping element is disposed between said at least one sensor and said inner liner.

Preferably, said at least one sensor device further includes at least one transmitting device. Typically, said at least one transmitting device is operatively connected to a first antenna.

Optionally, the system according to the invention further comprises a filtering device adapted for low-pass filtering said acceleration signal.

The at least one sensor device further preferably comprises at least one power source. Typically, said at least one power source comprises at least one battery.

According a preferred embodiment, said at least one power source comprises at least one self-powering device being adapted to generate electrical power as a result of mechanical stresses undergone by said at least one sensor device during running of said vehicle.

Said at least one self-powering device may comprise at least one piezoelectric element.

Said at least one self-powering device may comprise at least one electrical storage circuit. Typically, said at least one electrical storage circuit comprises at least a resistor and a capacitor.

Preferably, said at least one processing unit is included within said at least one sensor device.

Preferably, the system further comprises a fixed unit adapted to be located on the vehicle, comprising a receiving device for receiving data from said at least one sensor device.

Typically, said receiving device comprises a second antenna.

Preferably, said first antenna and said second antenna are adapted for data transmission at a frequency comprised between 400 and 450 MHz.

According to a third aspect, the present invention provides a method of controlling a vehicle having at least one tyre fitted thereon, comprising: determining a cornering angle of said tyre as set forth above; forwarding said determined cornering angle to a vehicle control system of the vehicle; and adjusting at least one parameter in said vehicle control system based on said determined cornering angle.

According to one embodiment, said vehicle control system comprises a brake control system, and said step of adjusting at least one parameter comprises the step of adjusting a braking force on said tyre.

According to another embodiment, said vehicle control system comprises a steering control system, and said step of adjusting at least one parameter comprises the step of selecting a maximum variation allowed from steering commands.

According to another embodiment, said vehicle control system comprises a suspension control system, and said step of adjusting at least one parameter comprises the step of adjusting a stiffness of a suspension spring associated to said tyre.

BRIEF DESCRIPTION OF THE DRAWINGS

Further features and advantages of the present invention will be better illustrated by the following detailed description of an example thereof, herein given with reference to the enclosed drawings, in which.

DETAILED DESCRIPTION OF THE INVENTION

Figure 1:
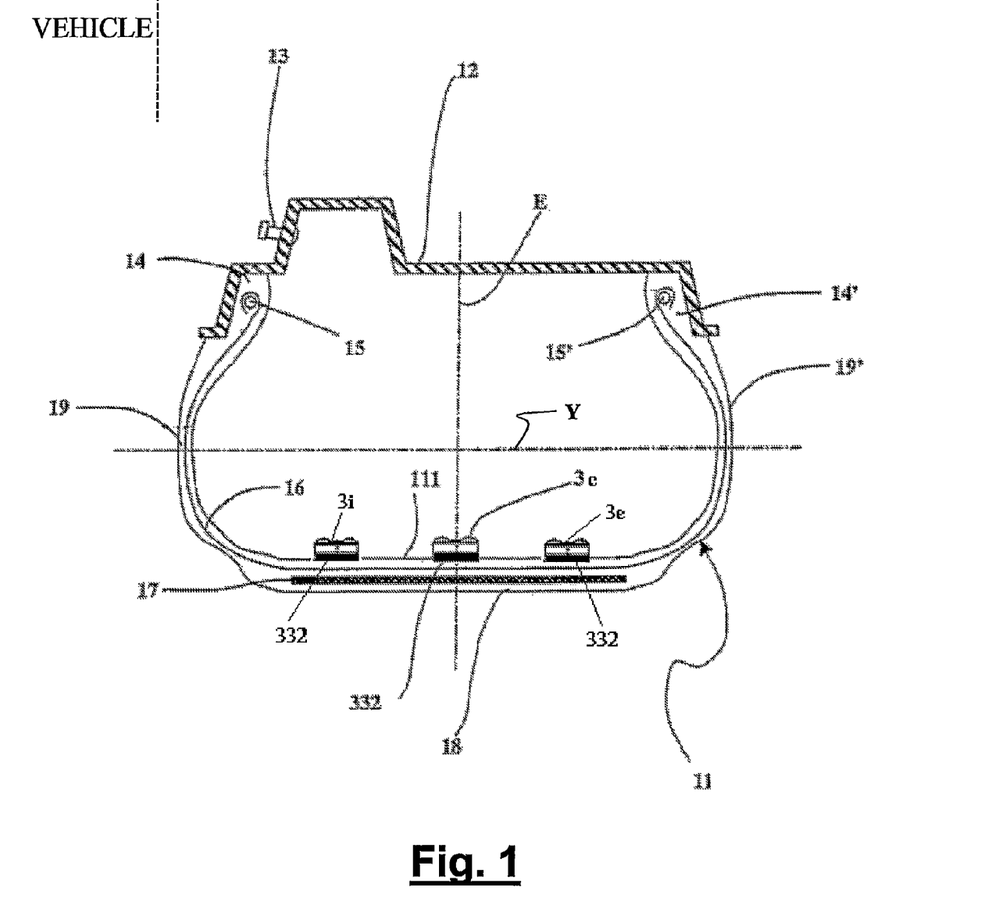
FIG. 1 shows a cross section of a tyre including a triad of sensor devices, according to a preferred embodiment of the invention.

FIG. 1 shows a cross section of a wheel comprising a tyre 11 and a supporting rim 12. The tyre 11 shown in FIG. 1 is of a type conventionally known as "tubeless", i.e. it does not include an inner tube. This tyre can be inflated by means of an inflation valve 13 positioned, for example, on the channel of the said rim 12. The tyre is fitted on a vehicle (not shown).

The tyre 11 includes a carcass 16, terminating in two beads 14 and 14', each formed along an inner circumferential edge of the carcass 16, for fixing the tyre 11 to the corresponding supporting rim 12. The beads 14, 14' comprise respective reinforcing annular cores 15 and 15', known as bead cores. The carcass 16 is formed by at least one reinforcing ply, including textile or metallic cords, extending axially from one bead 14 to the other 14' in a toroidal profile, and having its ends associated with a respective bead core 15 and 15'. In tyres of the type known as radial, the aforesaid cords lie essentially in planes containing the axis of rotation of the tyre. An annular structure 17, known as belt structure, is placed in a radially external position with respect to the carcass 16.

Typically, the belt structure 17 includes one or more strips of elastomeric material incorporating metal and/or textile cords, overlapping with each other. A tread band 18 of elastomeric material is wound around the belt structure 17 and impressed with a relief pattern for the rolling contact of the tyre with the ground. Two sidewalls 19 and 19' of elastomeric material, each extending radially outwards from the outer edge of the corresponding bead 14 and 14', are also placed on the carcass 16 in axially opposed lateral positions. In tubeless tyres the inner surface of the carcass 16 is normally covered with a liner 111, i.e. with one or more layers of air-impermeable elastomeric material. Other known elements, such as for example bead fillers may be provided, according to the specific design of the tyre 11.

At least one sensor device 3i, 3e, that will be described in detail in the remainder of the description, is associated with the tyre 11. The at least one sensor device 3i, 3e is used for determining at least an acceleration in lateral direction (indicated as Y in FIG. 1) of the tyre when the latter is rolling on a rolling surface. The at least one sensor device 3i, 3e is placed at a distance from the equatorial plane of the tyre, as it will be discussed below. The at least one sensor device 3i, 3e may be located in a tyre portion corresponding to the tread of the tyre 11, i.e. the portion of the tyre 11 axially extended between the sidewalls of the tyre 11. More particularly, such sensor may be disposed in a shoulder region of the above tyre portion, i.e. at a certain distance from the equatorial plane E of the tyre.

In a preferred embodiment, two sensor devices 3i, 3e may be disposed on opposite sides with respect to the equatorial plane of the tyre 11, more preferably substantially symmetrically with respect to the equatorial plane of the tyre 11. This embodiment may be desirable in particular for a cross-check of the measurements performed by the sensor devices 3i, 3e. Preferably, the two sensor devices may be placed substantially along the same meridian plane of the tyre, i.e. a plane containing the tyre rotation axis.

In a preferred embodiment, a third sensor device 3c is placed on the tyre, more preferably substantially along the same meridian plane of the at least one sensor 3i, 3e. The third sensor device is disposed substantially on the equatorial plane E of the tyre 11. In the present description, the sensor device 3i that is closer to the vehicle is referred to as the "internal sensor device" whilst the sensor device 3e that is at the outermost portion of the tyre is referred to as "external sensor device". For the purposes of the present invention, the expression "substantially along the same meridian plane" contemplates a certain amount of misalignment of the sensors with respect to said meridian plane, that can be expressed in terms of the angle comprised between the meridian planes defined by the sensor positions. Preferably, the tolerated misalignment may correspond to an angle not greater than 5°, more preferably not greater than 3°, even more preferably not greater than 1°. Preferably, the external and/or internal sensor devices should be disposed at a distance from the equatorial plane E of the tyre 11 comprised between 15% and 30% of the tread width, more preferably between 18% and 28% of the tread width, even more preferably between 20% and 25% of the tread width. For example, in a tyre having a tread width of 195 mm, two sensor devices 3i, 3e may be disposed on opposite sides with respect to the equatorial plane, each at a distance of 45 mm thereof.

The sensor devices 3c, 3i, 3e are preferably secured to the inner liner 111 of the tyre 11. A fixing element 332 adheres both to each sensor device and to the inner liner 11. Suitable materials for the fixing element 332 may include generally flexible rubbers, such as for example natural rubber, or synthetic rubber, e.g. rubbers made from conjugated dienes having from 4 to 10 carbon atoms such as polyisoprene, polybutadiene, styrene-butadiene rubber and the like. In preferred embodiments, a material included in the fixing element 332 should have a damping effect, in order to secure the fixing of the sensor devices to the inner surface of the tyre, and reduce, at the same time, the mechanical stresses exerted onto the fixing surface during use of the tyre 11. Furthermore, a damping material reduces the probability of damages to the sensor devices by preventing transmission of the above stresses to the device. Suitable damping materials may have a Shore A hardness (measured at 23° C. according to ASTM Standard D2240) of from about 1 to about 40, and an elastic rebound (measured at 23° C. according to ASTM Standard D1054) lower than about 60. Cross-linked diene elastomers or polyurethane gel materials may be adapted in order to fit with these damping specifications. For improved adhesion between the sensor devices and the liner 111, it may be advantageous to interpose a further adhesive element, for example a double-sided adhesive film, between the fixing element 332 and the inner surface of the liner 111, and/or between the fixing element 332 and the sensor devices 3e, 3i, 3c. An appropriate double-sided adhesive film may be the Scotch® 300SL HI Strength, marketed by 3M. In alternative embodiments, the sensor devices 3c, 3i, 3e may be incorporated within the structure of the tyre in the tread area, for example within the tread band 18, or between the outer belt strip of the belt structure 17 and the tread band 18.

In a preferred embodiment of the present invention (not shown), several groups of sensor devices may be disposed within the tyre 11, in circumferential positions spaced one from each other, preferably of substantially the same angle. For example, three groups of sensor devices may be located within the tyre, circumferentially spaced from each other of an angle of substantially 120°. Each group of sensor devices may comprise one or more sensor devices. With regards to the number, the disposition and the securing to the tyre of the sensor devices in each group, reference is made to what said above. More particularly, corresponding sensor devices belonging to different groups may be located substantially along planes parallel to the equatorial plane of the tyre. The use of several groups of sensor devices disposed in circumferentially spaced positions within the tyre allows to achieve more accuracy and reliability of the measurements performed, as well as a better monitoring of the tyre during the entire wheel turn.

The sensor devices $3c$, $3i$, $3e$ are adapted to communicate with a unit external to the tyre 11. Such external unit is referred to in the present description as "fixed unit". The fixed unit may be located on the vehicle on which the tyre 11 is fitted.

Figure 2:
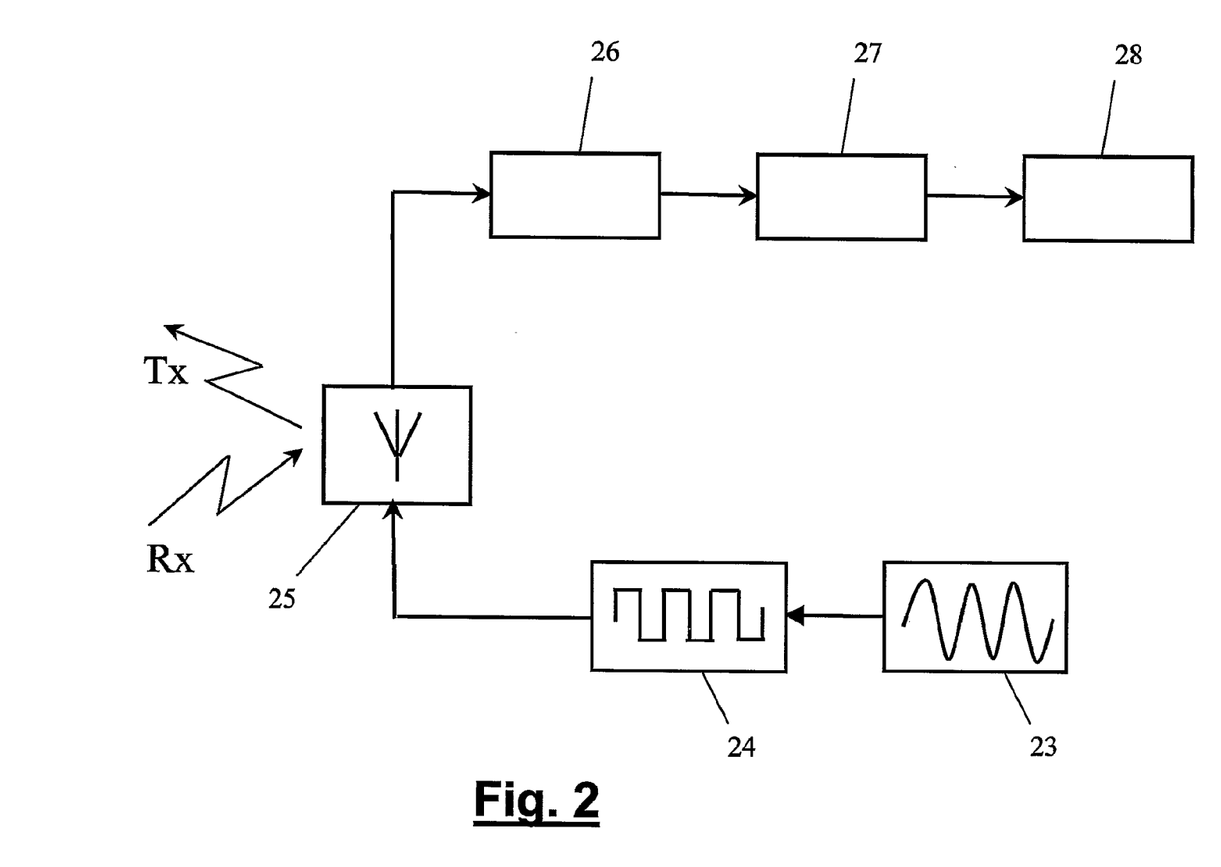
FIG. 2 shows a diagram of an embodiment of fixed unit included in a system according to the invention.

For example, FIG. 2 shows a block diagram of a fixed unit 2, comprising a device for receiving from the sensor device $3c$, and/or $3i$, and/or $3e$ included within the tyre 11. Preferably, the fixed unit 2 also comprises a device for transmitting to said sensor device $3c$, and/or $3i$, and/or $3e$. The receiving device may comprise a radio-frequency receiver 26 connected to an antenna 25, referred to below as the "fixed antenna". Preferably, the receiving device also comprises an electrical demodulator device 27. A memory 28, such as for example an EPROM, can store the data received by the sensor device $3c$, and/or $3i$, and/or $3e$ and demodulated by the demodulator 27. In preferred embodiments, the memory 28 is associated to a central processing unit (CPU, not shown in FIG. 2), in order to perform calculations from the data received by the sensor device $3c$, and/or $3i$, and/or $3e$, and/or stored in the memory 28. The memory 28 may also store historical logs, for example of measures of vehicle instability, or of steps that the control system has taken to control the vehicle, or of alarms displayed to the vehicle driver. The transmission device preferably comprises an oscillator circuit 23, which supplies a driver circuit 24 for the fixed antenna 25. If the fixed unit 2 is located on the vehicle, the electrical energy required to power the fixed unit 2 can be supplied directly by the vehicle battery.

Figure 3:
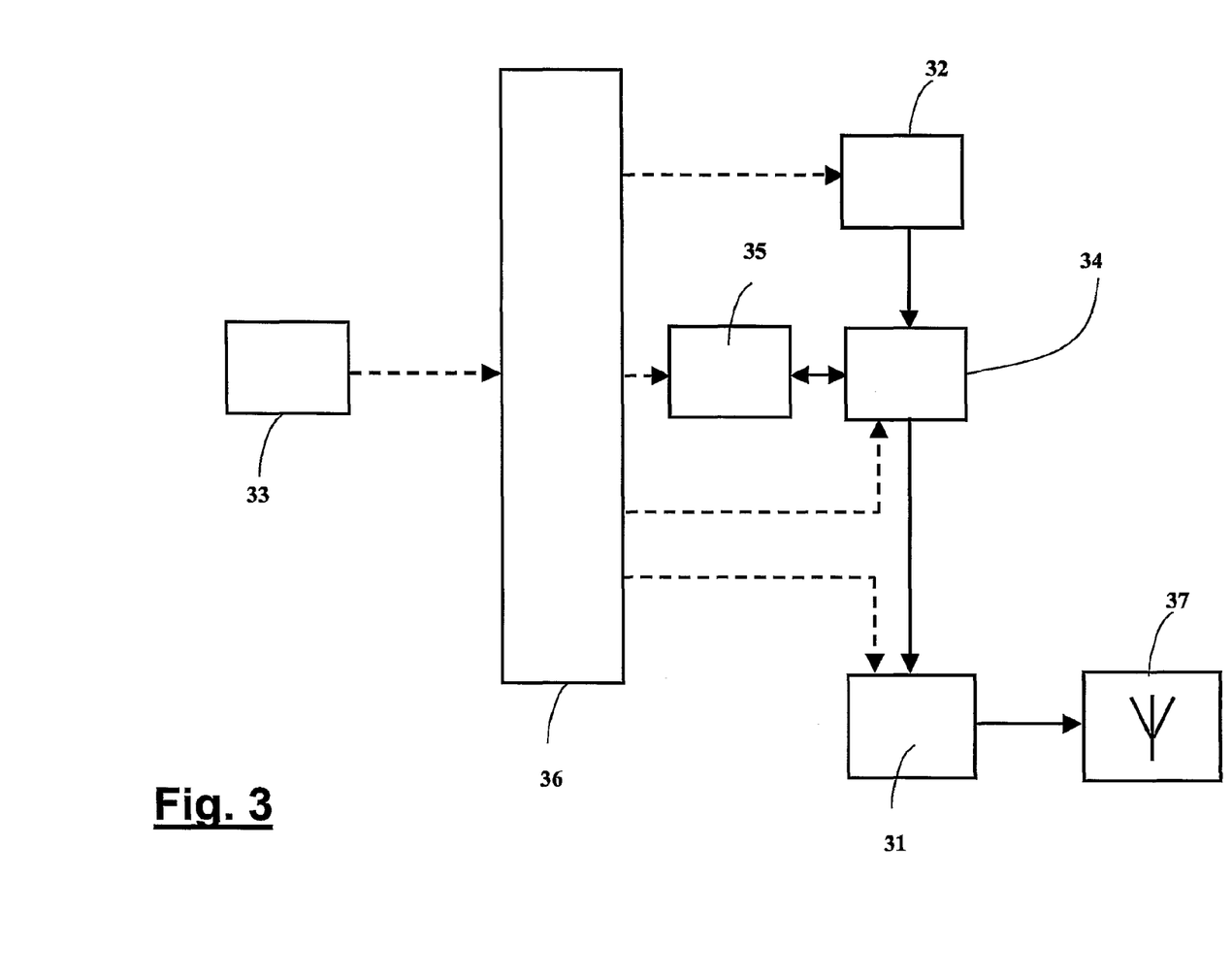
FIG. 3 shows a diagram of an embodiment of sensor device included in a tyre according to the invention.

Each sensor device $3c$, $3e$ or $3i$, an exemplary block diagram of which is shown in FIG. 3, comprises in general terms a device 31 for data transmission to the said fixed unit and a measuring device 32. In the internal/external sensor devices $3i$, $3e$, the measuring device 32 enables a determination of at least the lateral acceleration to which the tyre portion associated with the sensor devices $3i$, $3e$ is subjected. Preferably, the measuring device 32 comprises an accelerometer adapted for measuring at least such lateral acceleration. In the sensor device $3c$, the measuring device 32 enables a determination of a radial acceleration to which the tyre portion associated with the sensor device $3c$ is subjected. The measuring device may preferably comprise a radial accelerometer. Such accelerometer should be capable of support and correctly measure very high acceleration values, as the radial accelerations supported by the tread area of the tyre may reach, at high speed, values of 500-1000 g, wherein g is the gravity acceleration.

In order to perform a real-time determination of the tyre cornering angle, the signal provided by the measuring device 32 should be acquired with high precision, preferably at any turn of the tyre. For this purpose, and taking into account the frequency rotation of a rolling tyre (particularly at high speed), the measuring device 32 preferably includes a sampling device (not shown) capable of enabling the reading of the signal at a frequency of at least 5 kHz, more preferably at a frequency of at least 7 kHz, so as to furnish a sampled signal thereof.

Each sensor device $3c$, $3i$, $3e$ typically includes also an antenna 37, referred to below as the "mobile antenna", operatively connected to said transmission device 31, for data transmission to the fixed antenna of the fixed unit. Transmission from the mobile antenna to the fixed antenna, and/or vice versa, may occur at conventional telemetry radio-frequencies, e.g. in a band comprised between 400 and 450 MHz (for example at 418 MHz or 433 MHz). Each sensor device $3c$, $3i$, $3e$ may further include a processing unit (CPU) 34, associated to a memory device 35. This memory device 35 may contain re-writable memory locations in which information about the measurements taken by the measuring device 32 can be stored.

Furthermore, it may also contain pre-stored instructions for the processing unit 34, suitable for pre-processing the signals coming from the measuring unit 32 before transmission, in order to reduce the amount of information sent out of the tyre 11. More particularly, the signal provided by the measuring device 32 may be pre-processed in order to detect characteristic points thereof, such as for example maxima and minima, the coordinates of which can be sent to the transmission device 31 for transmission to the fixed unit. This results in saving transmission bandwidth and required power for transmission.

Furthermore, a filtering device (not shown) may be interposed between the measuring unit 32 and the processing unit 34, in order to low-pass filter the deformation signal and discriminate the useful signal from high-frequency noise caused by the interaction between the tread band and the road. However, such filtering may be provided by electronics included within the measuring device 32 or as further pre-processing instruction stored within the memory 35.

A power source 33 allows to energize the elements included in the sensor devices $3c$, and/or $3i$, and/or $3e$. The power source 33 may include a battery. However, for a real-time determination of the tyre cornering angle, a great electrical power consumption may be requested by the measuring device 32 (in particular by a high frequency sampling device), by the processing unit 34 and by the transmission device 31, so that a battery could have short lifetime, as compared to the entire life of the tyre. Thus, in preferred embodiments, the power source 33 includes a self-powering device, which generates electricity as a result of the mechanical stresses to which said self-powering device is subjected (for example, centrifugal force, or the deformations of the liner, or movements due to travelling on uneven roads). As an example, piezoelectric materials may be used in the self-powering device for such purpose. The self-powering device may also include an electrical energy storage circuit (not shown), typically including a resistor and a capacitor. As a further alternative, the sensor devices $3c$, and/or $3i$, and/or $3e$ may be energized by the fixed unit 2, by means of a suitable receiving device (not shown), connected to the mobile antenna 31.

A device for distributing the electrical power 36 preferably distributes appropriately the electrical power provided by the power source 33 to said processing unit 34, to said memory device 35, to said device for transmitting 31 and to said measuring device 32, according to their requirements.

It has to be noticed that it is not necessary to include the measuring device, the transmission portion to the fixed unit and the control electronics within a single packaged sensor device. For example, the control electronics and the transmission portion to the fixed unit could be packaged in a separated device secured to other parts of the tyre or of the wheel (e.g. the rim, or the sidewall), associated by a wired or wireless (e.g. optical or by radio-frequency) connection to a measuring device located in the tread area portion of the tyre.

Figure 4:
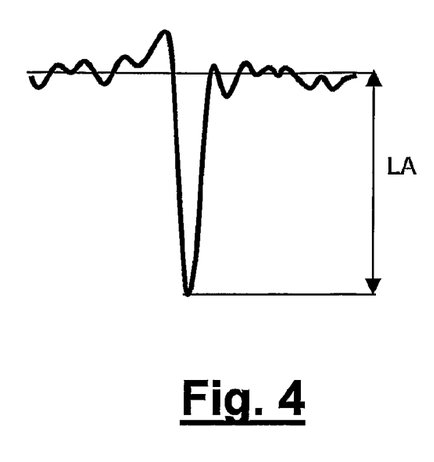
FIG. 4 shows an exemplary lateral acceleration curve obtained after filtering a lateral acceleration signal taken by an external sensor.

FIG. 4 shows, by way of example, a portion of a typical lateral acceleration curve obtained by an external sensor device including a lateral accelerometer, secured to the inner liner of a tyre, at a distance from an equatorial plane, after a sampling and a filtering of the corresponding acceleration signal. It should be noticed that, at the passage of the sensor device in correspondence of the contact region (i.e. the region between tyre and the rolling surface), the level of lateral acceleration sensed by the external accelerometer slightly increases, starting from an average level, when the sensor device begins its passage under the contact region, then drops abruptly to a minimum value when it is about in the middle of the contact region and finally returns to about the average level. The average level of the lateral acceleration outside the contact region may be not null due to the tyre curvature near the shoulders.

Figure 5:
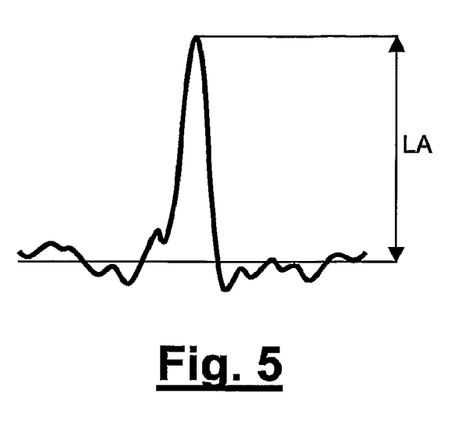
FIG. 5 shows an exemplary lateral acceleration curve obtained after filtering a lateral acceleration signal taken by an internal sensor.

Similarly to FIG. 4, FIG. 5 shows, by way of example, a portion of a typical lateral acceleration curve obtained by an internal sensor device including a lateral accelerometer, secured to the inner liner of a tyre, at a distance from an equatorial plane, after a sampling and a filtering of the corresponding acceleration signal. It should be noticed that, at the passage of the sensor device in correspondence of the contact region, the level of lateral acceleration sensed by the external accelerometer slightly decreases when the sensing device begins its passage under the contact region, then raises abruptly from an average level to a maximum value when it is about in the middle of the contact region and finally decreases and returns to about the average level.

For the purposes of the present invention, the distance between the peak value (minimum value in FIG. 4, maximum value in FIG. 5) and the average level is termed lateral amplitude (briefly, LA). Different values of lateral amplitude could result by measurements performed on signals acquired by internal and external sensor devices.

The curves of FIGS. 4 and 5 show that when the tyre portion corresponding to the position of a sensor device begins and ends its passage under the contact region, such tyre portion is subjected to a lateral deformation which becomes maximum near the middle of the contact region (corresponding to the peaks shown in the curves), and which is much stronger than the lateral acceleration to which the tyre portion is subjected in other positions (corresponding to the average level of acceleration value outside the contact region).

Figure 6:
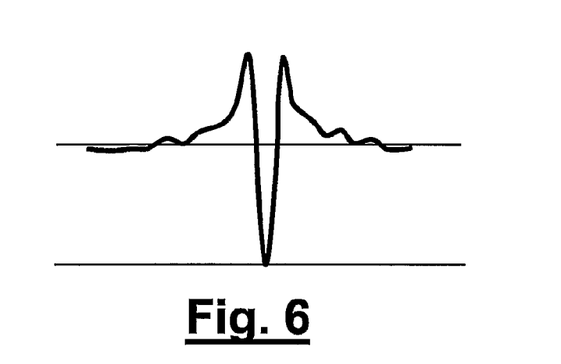
FIG. 6 shows an exemplary radial acceleration curve obtained after filtering a radial acceleration signal.

In addition to measurements performed in lateral direction through the internal and/or external sensor devices $3i$, $3e$, a rotation speed of the tyre can be calculated from a radial acceleration signal taken from the central sensor device $3c$. FIG. 6 shows, by way of example, a portion of a typical radial acceleration curve obtained by a central sensor device $3c$ including a radial accelerometer, secured to the inner liner of a tyre, at the equatorial plane of the tyre, after a sampling and a filtering of the corresponding acceleration signal. It should be noticed that, at the passage of the sensor device $3c$ in correspondence of the contact region, the level of radial centrifugal acceleration sensed by the accelerometer increases abruptly a first time, then it drops to until substantially zero when it is about in the middle of the contact region and finally it increases abruptly a second time. In other positions the radial acceleration sensed by the accelerometer has an average level related to the rotation speed of the rolling tyre: the higher the speed, the higher the sensed acceleration. The rotation speed of the tyre can be derived by $\sqrt{(a_r/r_r)}$ wherein $a_r$ is the average radial acceleration calculated before or after entering the contact area with the rolling surface (i.e. using a portion of the radial acceleration signal outside from the peaks shown in FIG. 6).

In a preferred embodiment, using a plurality of sensor devices located within the tyre at different circumferential positions, a first sensor device, disposed on the equatorial plane of the tyre (such sensor $3c$ in FIG. 1) and located outside the contact region, can be used in order to measure the average radial acceleration level a (and thus derive the instantaneous rotation speed of the tyre), in real-time, in the same time interval in which a second sensor device, disposed at a distance from the equatorial plane of the tyre (such as sensors $3i$, $3e$ in FIG. 1) and measuring the lateral acceleration, is in correspondence of the contact region. Simple control electronics can be implemented within the sensor devices or within the fixed unit in order to coordinate the needed measurements.

The Applicant has found that the lateral acceleration to which a portion of the tyre corresponding to the tyre tread, located at a distance from the equatorial plane, is subjected during passage in the contact region, is related to the cornering (or slip) angle of a tyre running on a rolling surface. In particular, the Applicant has found that the lateral amplitude measured at a distance from the equatorial plane is substantially a function only of the tyre rotation speed and of the cornering (or slip) angle.

This result will be shown in the following, by making reference to the description of the results of a number of tests performed by the Applicant using a tyre Pirelli® P6 195/65R15. In a first series of tests, the Applicant has measured values of $LA_e$ and $LA_i$, namely the lateral amplitude measured by, respectively, an external and internal lateral accelerometer $3e$, $3i$, versus a load applied to the tyre. Different cornering angles (−2°, −1°, 0°, +1°, +2°) were applied to the tyre. The tyre was run at different speeds. The camber angle was set to 0°.

Figure 7:
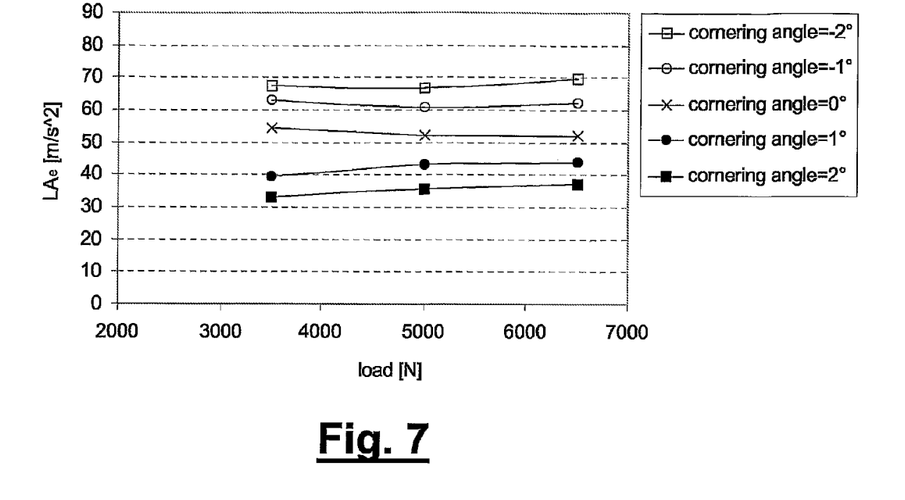
FIG. 7 shows a plot carrying curves of lateral acceleration peaks measured by an external sensor versus tyre load.

FIG. 7 shows a plot carrying curves of lateral amplitude $LA_e$ measured by the external accelerometer (ordinate) versus tyre load (abscissa) for different cornering angles at a constant speed (40 Km/h in the specific case). Different lines correspond to different cornering angles. As it can be seen, the lateral amplitude value does not substantially change with the tyre load.

Figure 8:
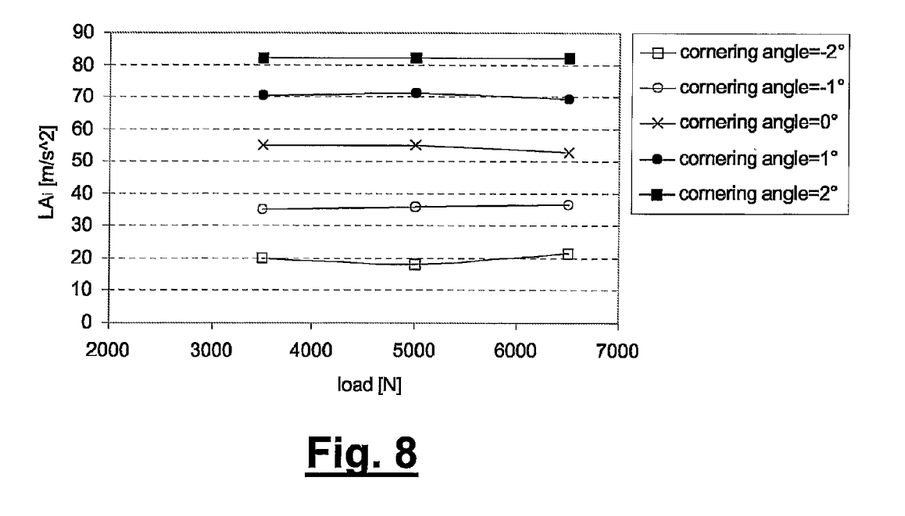
FIG. 8 shows a plot carrying curves of lateral acceleration peaks measured by an internal sensor versus tyre load.

FIG. 8 shows a plot carrying curves of lateral amplitude $LA_e$ measured by the internal accelerometer (ordinate) versus tyre load (abscissa) for different cornering angles at a constant speed (the same as for FIG. 7). Different lines correspond to different cornering angles. As it can be seen, also in this case the lateral amplitude value does not substantially change with the tyre load.

Figure 9:
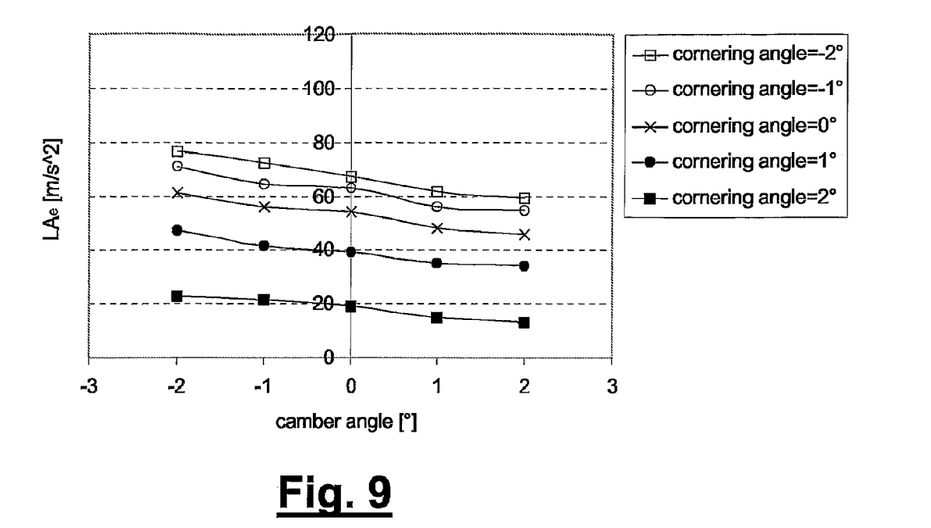
FIG. 9 shows a plot carrying curves of lateral acceleration peaks measured by an external sensor versus camber.

In a second series of tests, the Applicant has measured values of $LA_e$ and $LA_i$, namely the lateral amplitude measured by an external and internal accelerometer $3e$, $3_i$, respectively, versus the camber angle, at a constant tyre load, at nominal inflation pressure and at a constant speed. Different cornering angles (−2°, −1°, 0°, +1°, +2°) have been set. FIG. 9 shows a plot carrying curves of $LA_e$, measured by the external accelerometer (ordinate) versus camber angle (abscissa) for different cornering angles at a speed of 40 Km/h and a tyre load of 3500 N. Different lines correspond to different cornering angles. As it can be seen, $LA_e$ scarcely depends on the camber angle in the range from −2° to +2°, i.e. in a sufficiently wide range of camber angles. Thus, the dependence of $LA_e$ from camber angle can be practically neglected.

Figure 10:
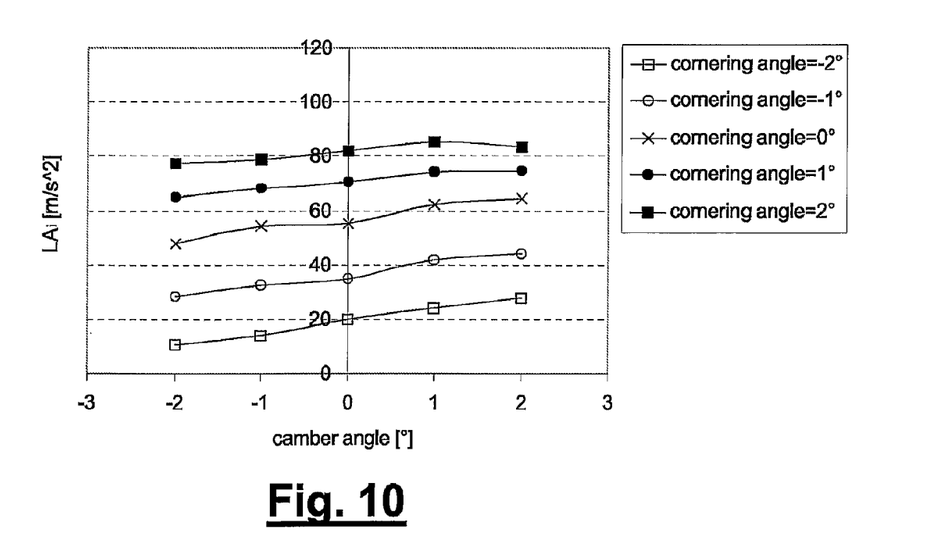
FIG. 10 shows a plot carrying curves of lateral acceleration peaks measured by an internal sensor versus camber.

Similarly, FIG. 10 shows a plot carrying curves of $LA_i$ measured by the internal accelerometer (ordinate) versus camber angle (abscissa) for different cornering angles, at the same speed and tyre load of FIG. 9. Different lines correspond to different cornering angles. As it can be seen, also in this case $LA_i$ scarcely depends on the camber angle, at least in a range from $-2°$ to $+2°$. Thus, again, the dependence of $LA_i$ from camber angle can be practically neglected.

In a third series of tests, the Applicant has measured values of $LA_e$ and $LA_i$, namely the lateral amplitude measured by an external and internal accelerometer 3e, 3i, respectively, versus tyre rotation speed, at a constant tyre load, at a null cornering angle and at nominal inflation pressure.

Figure 11:
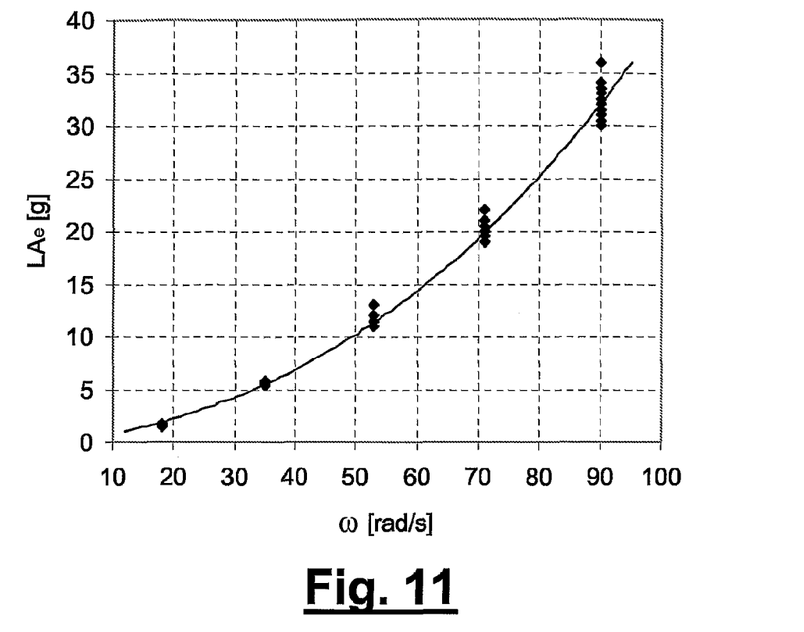
FIG. 11 shows a plot carrying curves of lateral acceleration peaks measured by an external sensor versus rotation speed ω.
Figure 12:
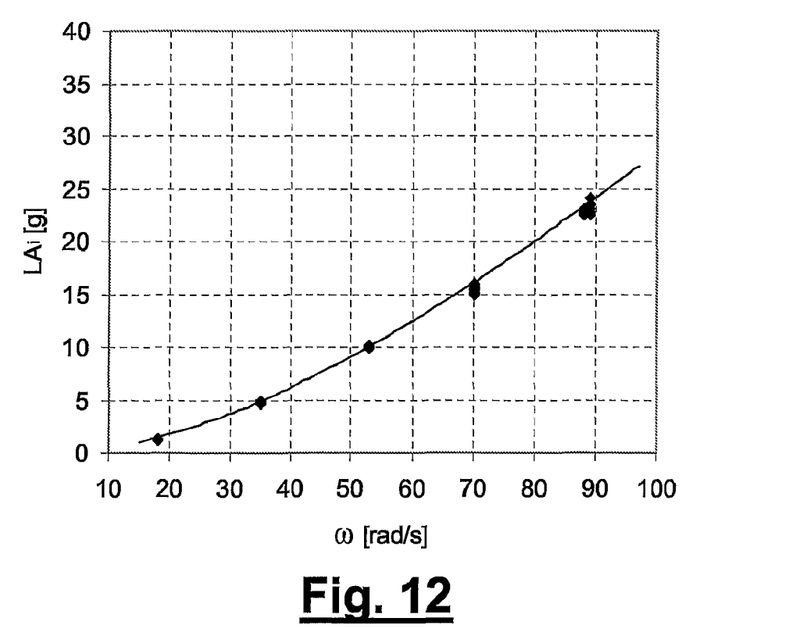
FIG. 12 shows a plot carrying curves of lateral acceleration peaks measured by an internal sensor versus rotation speed ω.

FIG. 11 shows a plot carrying a curve of $LA_e$ (ordinate) versus rotation speed ω (abscissa). FIG. 12 shows a plot carrying a curve of $LA_i$ (ordinate) versus rotation speed ω (abscissa). As it can be seen, LA strongly depends on the rotation speed. In particular, LA substantially depends on $ω^2$.

Figure 13:
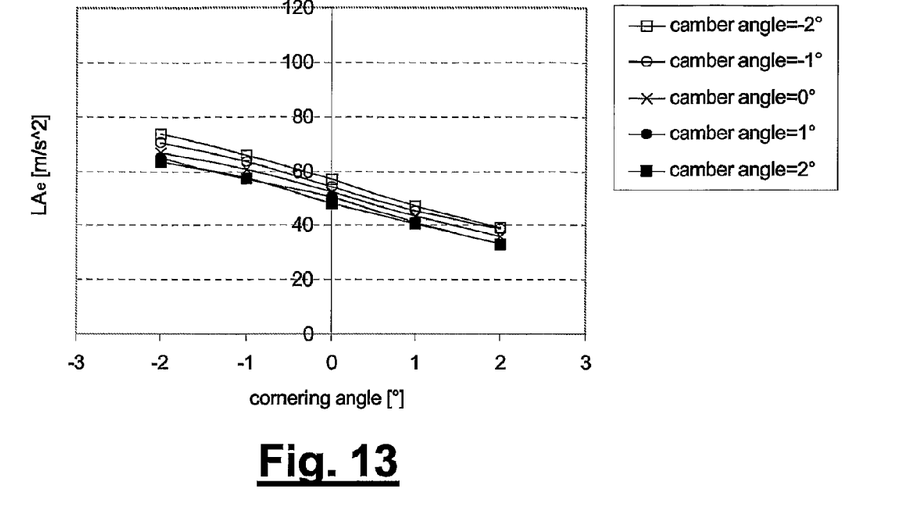
FIG. 13 shows a plot carrying curves of lateral acceleration peaks measured by an external sensor versus cornering angle.
Figure 14:
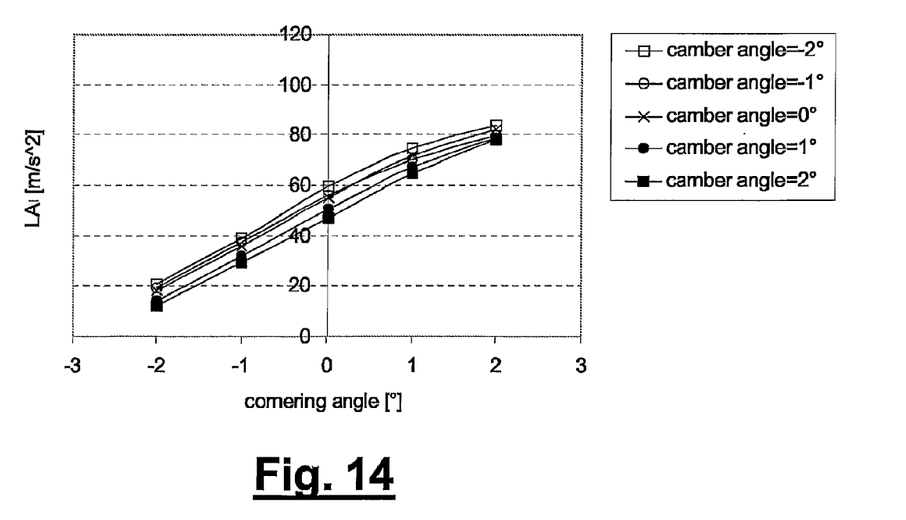
FIG. 14 shows a plot carrying curves of lateral acceleration peaks measured by an internal sensor versus cornering angle.

Finally, in a fourth series of tests, the Applicant has measured values of $LA_e$ and $LA_i$, namely the lateral amplitude measured by an external and internal accelerometer 3e, 3i, respectively, versus cornering angle, at a constant tyre load, at nominal inflation pressure and at a constant speed. Different camber angles ($-2°$, $-1°$, $0°$, $+1°$, $+2°$) have been set. FIG. 13 shows a plot carrying curves of $LA_e$ measured by the external accelerometer (ordinate) versus cornering angle (abscissa) for different camber angles, at a tyre load of 5000 N and a speed of 40 Km/h. FIG. 14 shows a plot carrying curves of $LA_i$ measured by the internal accelerometer (ordinate) versus cornering angle (abscissa) for different camber angles, at the same tyre load and speed of FIG. 13. Different curves in both FIG. 13 and FIG. 14 correspond to different camber angles. It is observed that:

the curves of FIG. 13 can be represented by straight lines in a plane, namely $$LA_e = K_e(ω)*α + Q_e(ω) \quad (1)$$

wherein $LA_e$ is the amplitude of the lateral acceleration measured by the external accelerometer; $K_e(ω)$ is the slope (only dependent on the tyre rotation speed w); α is the cornering angle; $Q_e(ω)$ is the intercept (only dependent on the rotation speed ω).

also the curves of FIG. 14 can be represented by straight lines in a plane, namely $$LA_i = K_i(ω)*α + Q_i(ω), \quad (2)$$

wherein $LA_i$ is the amplitude of the lateral acceleration measured by the internal accelerometer; $K_i(ω)$ is the slope (only dependent on the tyre rotation speed ω); α is the cornering angle; $Q_i(ω)$ is the intercept (only dependent on the rotation speed w).

the slope of the curves of FIG. 13 is reversed with respect to the slope of the curves of FIG. 14; their absolute values $|K_e|$ and $|K_i|$ may be, in general different from each other at the same rotation speed.

The above described results show that it is possible to derive the cornering angle from a lateral acceleration signal and from the rotation speed of the tyre.

In particular, it has been found that a linear relationship may relate the lateral amplitude and the cornering angle, at constant rotation speed. The slope and the intercept of the linear relationship may be determined in a characterization test of the tyre, by a linear fit of values of lateral amplitude, measured from internal and/or external sensor devices, versus predetermined cornering angles, at constant speed. In order to take into account the rotation speed, the above characterization test and the linear fit can be repeated for predetermined values of rotation speed w for the tyre under test, so as to determine the corresponding slopes and intercept values thereof.

From the above characterization, when the radial speed is estimated, the cornering angle can be directly derived by using equation (1) and/or (2).

$$α = [LA_e - Q_e(ω)]/K_e(ω) \quad (3)$$

$$α = [LA_i - Q_i(ω)]/K_i(ω) \quad (4)$$

The value of $LA_e$ or $LA_i$ can be derived from the lateral acceleration signal emitted from the sensor device 3e or, respectively, 3i. The above described formulas for the calculation of the cornering angle, as well as the fit coefficients K and Q, for predetermined values of rotation speed, can be stored in the memory included within the fixed unit or within the sensor devices 3e or 3i. The above described characterization of the tyre can be performed once per tyre model, for example in indoor tests.

As discussed above, in a sensor arrangement comprising central sensor 3c, the radial speed of the tyre can be derived through the radial acceleration signal taken from the central sensor device 3c. However, any other method available to the skilled in the art for determining the tyre rotation speed can be exploited for the purposes of the present invention.

It should be clear that the above method for deriving the cornering angle of the tyre can be implemented not only by using the described methods and arrangement of sensor devices 3c, 3i, 3e, but with any other method or arrangement useful for calculating or deriving the lateral acceleration to which a portion of the tyre corresponding to the tyre tread, located at a distance from the equatorial plane, is subjected during rolling.

The Applicant believes that the fit coefficients do not vary considerably according to the tyre pressure, at least in a range around the nominal value, defined by the vehicle and tyre manufacturers. In any case, for a more complete and exhaustive tyre characterization, the same tests described herein for a pressure equal, or very close, to the nominal one could be performed at different pressure values in order to find a corresponding set of fit coefficients related to such pressure values.

A real-time determined cornering angle of a tyre mounted on a vehicle is an important parameter that can be passed to a vehicle control system, in order to control the behaviour of the vehicle, particularly in critical conditions. A vehicle control system may comprise a brake controller (for example, an anti-lock brake unit), and/or a steering controller, and/or a suspension controller and/or a vehicle stability control system.

For example, a vehicle brake control system may adjust the braking force on each tyre according to the real-time determined cornering angle.

As another example, the vehicle stability envelope may be detected by the vehicle control system in order to select the maximum perturbation allowed from steering commands. This information may be compared with the real-time determined cornering angle in order to understand if a dangerous yaw rate could be reached. Possibly, a correction command could be also imparted to a steering control system (Electrically Assisted Steering Systems).

The conditions of the vehicle may indicate that the performance of the vehicle is reduced and that the driver should restrict his driving manoeuvres. The vehicle control system itself can take action, for example in order to limit the maximum vehicle speed to maintain stability and not exceed the tyre specifications, or to limit steering yaw rate in order to keep rollovers from occurring. The driver may be alerted to the current vehicle control system condition and of the actions that the vehicle control system has taken on his behalf to safe the vehicle (reducing the maximum attainable speed, steering rate, engine power), as needed on a display device. On the same display device it may also be shown whether he should take further action on his own (change the distribution of mass, restrict driving manoeuvres and speed). The display device may comprise a visual and/or an audible unit, for example located in the dashboard of the vehicle.

There have thus been shown and described a novel system and a novel method which fulfil all the objects and advantages sought therefore. Many changes, modifications, variations and other uses and applications of the subject invention will, however, become apparent to those skilled in the art after considering the specification and the accompanying drawings which disclose preferred embodiments thereof.

For example, the actual storing of the fit functions and/or of the fit coefficients K and Q within the memory associated to the sensor device and/or to the fixed unit may be substituted by the storing of a database collecting the cornering angle value versus predetermined values of lateral amplitudes and rotation speed (and, possibly, of pressure). As another example, a fit may be also performed for finding a function describing the slope K and/or the intercept Q versus the rotation speed. Furthermore, different functions may relate the lateral amplitude and the cornering angle, functions that can be determined by fit or by any available method.

As said above with reference to FIGS. 9 and 10, both $LA_e$ and $LA_i$ scarcely depend on the camber angle and thus the dependence of $LA_e$ and $LA_i$ from the camber angle can be practically neglected. In any case, for a more complete and exhaustive tyre characterization, the same tests described herein for one camber angle could be performed at different camber angles in order to find a corresponding set of fit coefficients also related to such camber angles.

All the changes, modifications, variations and other uses and applications which do not depart from the scope of the invention are deemed to be covered by the invention which is limited only by the claims which follow.

The invention claimed is:

1. A method for determining a cornering angle of a tyre fitted on a vehicle during running of said vehicle on a rolling surface, comprising:
   determining a lateral acceleration of a portion of said tyre axially extending between a pair of sidewalls of the tyre and which is spaced a distance from an equatorial plane of said tyre;
   determining a rotation speed of said tyre; and
   wherein said determining the lateral acceleration comprises acquiring a lateral acceleration signal when said portion of the tyre is outside a contact region between said tyre and said rolling surface, and acquiring a lateral acceleration signal when said portion of the tyre is within said contact region; and
   wherein said determining the lateral acceleration signal comprises calculating a peak value of said lateral acceleration signal within said contact region; and
   determining said cornering angle from said lateral acceleration and said rotation speed.

2. The method according to clam 1, wherein said determining the lateral acceleration comprises calculating an average level of the lateral acceleration signal outside said contact region.

3. The method according to claim 2, wherein said determining the lateral acceleration comprises calculating a lateral acceleration amplitude as a difference between said average level and a peak value.

4. The method according to claim 1, further comprising low-pass filtering said lateral acceleration signal.

5. The method according to claim 1, wherein said determining the rotation speed of said tyre comprises acquiring a radial acceleration signal.

6. The method according to claim 5, wherein said acquiring a radial acceleration signal comprises acquiring such a radial acceleration signal at or in proximity of said equatorial plane of the tyre.

7. The method according to claim 5, wherein said determining the rotation speed of said tyre comprises calculating an average radial acceleration of said radial acceleration signal when said portion of the tyre is outside said contact region between said tyre and said rolling surface.

8. The method according to claim 3, wherein said determining said cornering angle comprises providing characteristic curves of lateral acceleration amplitude versus predetermined values of cornering angle for at least one rotation speed.

9. The method according to claim 8, further comprising providing a fit equation approximating said characteristic curves.

10. The method according to claim 9, wherein said providing a fit equation comprises providing an equation of a straight line in a plane, and wherein said method further comprises associating values of slope and intercept of said fit straight line for at least one value of tyre rotation speed.

11. A system for determining a cornering angle of a tyre fitted on a vehicle during running of said vehicle on a rolling surface, comprising:
    at least one device configured to determine a lateral acceleration of a portion of said tyre axially extending between a pair of sidewalls of said tyre, the portion being located at a distance from an equatorial plane of said tyre;
    wherein the lateral acceleration is acquired from a lateral acceleration signal from said portion of the tyre outside a contact region between said tyre and said rolling surface, and the lateral acceleration signal is acquired when said portion of the tyre is within said contact region; and
    wherein the lateral acceleration signal is calculated from a peak value of said lateral acceleration signal within said contact region; and
    at least one device adapted for determining a rotation speed of said tyre; and
    at least one processing unit being adapted to determine said cornering angle from said lateral acceleration and said rotation speed.

12. The system according to claim 11, wherein said at least one device for determining the lateral acceleration comprises at least one lateral accelerometer adapted for producing at least one lateral acceleration signal.

13. The system according to claim 11, wherein said at least one device for determining the rotation speed comprises at least one radial accelerometer adapted for producing at least one radial acceleration signal.

14. The system according to claim 11, wherein said at least one device for determining the lateral acceleration and said at least one device for determining the rotation speed of said tyre comprises at least one sampling device adapted to sample signals at a frequency of at least 5 kHz.

15. The system according to claim 14, wherein said at least one sampling device is adapted to sample signals at a frequency of at least 7 kHz.

16. The system according to claim 11, further comprising at least one memory associated with said processing unit.

17. The system according to claim 16, wherein said at least one memory comprises pre-stored characteristic functions of cornering angle versus lateral acceleration amplitudes corresponding to predetermined values of tyre rotation speed.

18. The system according to claim 11, wherein said at least one device for determining said lateral acceleration is included in at least one sensor device associated with said portion of said tyre.

19. The system according to claim 18, wherein said at least one sensor device is disposed at a distance from said equatorial plane of the tyre comprising 15% to 30% of the tread width.

20. The system according to claim 19, wherein said at least one sensor device is disposed at a distance from said equatorial plane of the tyre comprising 18% to 28% of the tread width.

21. The system according to claim 19, wherein at least one sensor device is disposed at a distance from said equatorial plane of the tyre comprising 20% to 25% of the tread width.

22. The system according to claim 18, wherein said at least one sensor device is secured to an inner liner of the tyre.

23. The system according to claim 22, wherein at least one damping element is disposed between said at least one sensor and said inner liner.

24. The system according to claim 18, wherein said at least one sensor device further comprises at least one transmitting device.

25. The system according to claim 24, wherein said at least one transmitting device is operatively connected to a first antenna.

26. The system according to claim 12, further comprising a filtering device adapted for low-pass filtering said acceleration signal.

27. The system according to claim 18, wherein said at least one sensor device further comprises at least one power source.

28. The system according to claim 27, wherein said at least one power source comprises at least one battery.

29. The system according to claim 27, wherein said at least one power source comprises at least one self-powering device capable of being adapted to generate electrical power as a result of mechanical stresses undergone by said at least one sensor device during running of said vehicle.

30. The system according to claim 29, wherein said at least one self-powering device comprises at least one piezoelectric element.

31. The system according to claim 29, wherein said at least one self-powering device comprises at least one electrical storage circuit.

32. The system according to claim 31, wherein said at least one electrical storage circuit comprises at least a resistor and a capacitor.

33. The system according to claim 18, wherein said at least one processing unit is included within said at least one sensor device.

34. The system according to claim 18, further comprising a fixed unit adapted to be located on the vehicle, comprising a receiving device for receiving data from said at least one sensor device.

35. The system according to claim 34, wherein said receiving device comprises a second antenna.

36. The system according to claim 35, wherein said second antenna is adapted for data transmission at a frequency of 400 to 450 MHz.

37. The system according to claim 25, wherein said first antenna is adapted for data transmission at a frequency of 400 to 450 MHz.

38. A method of controlling a vehicle having at least one tyre fitted thereon, comprising:
    determining a cornering angle of said tyre by a method according to claim 1;
    forwarding said determined cornering angle to a vehicle control system of the vehicle; and
    adjusting at least one parameter in said vehicle control system based on said determined cornering angle.

39. The method according to claim 38, wherein said vehicle control system comprises a brake control system and wherein said adjusting at least one parameter comprises adjusting a braking force on said tyre.

40. The method according to claim 38, wherein said vehicle control system comprises a steering control system, and wherein said adjusting at least one parameter comprises selecting a maximum variation allowed by the steering control system.

41. The method according to claim 38, wherein said vehicle control system comprises a suspension control system and wherein said adjusting at least one parameter comprises adjusting stiffness of a suspension spring associated with said tyre.

* * * * *